(12) United States Patent
Lin et al.

(10) Patent No.: US 10,091,807 B2
(45) Date of Patent: *Oct. 2, 2018

(54) WIRELESS TRANSMISSION OVER SPACE-TIME CHANNELS

(71) Applicant: INTEL CORPORATION, Santa Clara, CA (US)

(72) Inventors: Xintian Lin, Mountain View, CA (US); Qinghua Li, San Ramon, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/410,167

(22) Filed: Jan. 19, 2017

(65) Prior Publication Data

US 2017/0135126 A1   May 11, 2017

Related U.S. Application Data

(63) Continuation of application No. 14/219,271, filed on Mar. 19, 2014, now Pat. No. 9,584,239, which is a
(Continued)

(51) Int. Cl.
*H04J 3/00* (2006.01)
*H04W 72/12* (2009.01)
(Continued)

(52) U.S. Cl.
CPC ...... *H04W 72/1263* (2013.01); *H04B 7/0697* (2013.01); *H04W 28/065* (2013.01);
(Continued)

(58) Field of Classification Search
CPC .......... H04W 72/1263; H04W 28/065; H04W 72/0453; H04W 84/12; H04W 88/08; H04B 7/0697; H04B 7/0617
(Continued)

(56) References Cited

U.S. PATENT DOCUMENTS 6,504,506 B1   1/2003   Thomas et al.
6,662,024 B2   12/2003   Walton et al.
(Continued)

FOREIGN PATENT DOCUMENTS

CN    1371221    9/2002
EP    1207661    5/2002
(Continued)

OTHER PUBLICATIONS

Jacob et al., "MAC Protocol Enhancements and a Distributed Scheduler for QoS Guarantees over the IEEE 802.11 Wireless LANs", 2002 IEEE 56th Vehicular Tech Conference Proceedings,Vancouver , Canada, Sep. 24-28, 2002, vol. 1of 4 XP010608866, 4 pages.

(Continued)

*Primary Examiner* — Faisal Choudhury

(74) *Attorney, Agent, or Firm* — Shichrur & Co.

(57) ABSTRACT

Embodiments of the present invention provide an Access Point (AP) to transmit and receive RF signals in a wireless local area network (WLAN), comprising, a processor to process the RF signals, a scheduler to schedule data packets that may have differing lengths for transmission to selected mobile stations, a Radio Frequency (RF) transceiver to receive and transmit the RF signals using space-time channels, and a code rate adjuster to adjust a code rate of Forward Error-Correction (FEC) codes in the packets to fill the space-time channels.

25 Claims, 4 Drawing Sheets

Related U.S. Application Data continuation of application No. 12/584,780, filed on Sep. 10, 2009, now abandoned, which is a continuation of application No. 10/749,293, filed on Dec. 30, 2003, now abandoned.

(51) Int. Cl.
| | |
|---|---|
| H04B 7/06 | (2006.01) |
| H04W 28/06 | (2009.01) |
| H04W 72/04 | (2009.01) |
| H04W 84/12 | (2009.01) |
| H04W 88/08 | (2009.01) |

(52) U.S. Cl.
CPC ....... *H04W 72/0453* (2013.01); *H04B 7/0617* (2013.01); *H04W 84/12* (2013.01); *H04W 88/08* (2013.01)

(58) Field of Classification Search
USPC .......................................................... 370/345
See application file for complete search history.

(56) References Cited

U.S. PATENT DOCUMENTS

| | | | |
|---|---|---|---|
| 6,721,302 B1* | 4/2004 | Alastalo | H04L 1/0083 370/346 |
| 6,826,240 B1 | 11/2004 | Thomas et al. | |
| 6,870,808 B1 | 3/2005 | Liu et al. | |
| 6,965,774 B1 | 11/2005 | Kasapi et al. | |
| 6,999,771 B1 | 2/2006 | Kasapi et al. | |
| 7,095,717 B2 | 8/2006 | Muniere | |
| 7,248,879 B1 | 7/2007 | Walton et al. | |
| 7,286,513 B2 | 10/2007 | Nguyen | |
| 7,352,718 B1 | 4/2008 | Perahia et al. | |
| 7,394,858 B2 | 7/2008 | Sadowsky et al. | |
| 7,450,613 B2 | 11/2008 | Choi et al. | |
| 8,027,637 B1* | 9/2011 | Bims | H04B 7/022 455/16 |
| 8,483,128 B2 | 7/2013 | Lin et al. | |
| 9,584,239 B2 | 2/2017 | Lin et al. | |
| 2001/0047424 A1* | 11/2001 | Alastalo | H04B 7/0842 709/236 |
| 2002/0051430 A1 | 5/2002 | Kasami et al. | |
| 2002/0093929 A1* | 7/2002 | Mangold | H04W 36/16 370/336 |
| 2002/0128027 A1 | 9/2002 | Wong et al. | |
| 2002/0181492 A1* | 12/2002 | Kasami | H04W 72/1257 370/445 |
| 2003/0096617 A1 | 5/2003 | Miller, II et al. | |
| 2003/0128658 A1 | 7/2003 | Walton et al. | |
| 2003/0203723 A1 | 10/2003 | Persson et al. | |
| 2003/0214928 A1 | 11/2003 | Chuah | |
| 2003/0227914 A1 | 12/2003 | Nguyen | |
| 2003/0235147 A1 | 12/2003 | Walton et al. | |
| 2004/0002357 A1* | 1/2004 | Benveniste | H04W 72/12 455/550.1 |
| 2004/0136349 A1 | 7/2004 | Walton et al. | |
| 2004/0145530 A1 | 7/2004 | Foore et al. | |
| 2005/0043031 A1 | 2/2005 | Cho et al. | |
| 2005/0063378 A1 | 3/2005 | Kadous | |
| 2005/0111376 A1 | 5/2005 | Raghothaman et al. | |
| 2005/0129068 A1 | 6/2005 | Ginzburg et al. | |
| 2005/0138199 A1 | 6/2005 | Li et al. | |
| 2005/0141495 A1 | 6/2005 | Lin et al. | |
| 2005/0147115 A1* | 7/2005 | Li | H04W 16/28 370/449 |
| 2005/0163103 A1 | 7/2005 | Malomsoky et al. | |
| 2006/0039312 A1 | 2/2006 | Walton et al. | |
| 2007/0081498 A1 | 4/2007 | Niwano | |
| 2013/0182632 A1* | 7/2013 | Maeda | H04W 28/0205 370/312 |

FOREIGN PATENT DOCUMENTS

| | | |
|---|---|---|
| WO | 2002/063836 | 8/2002 |
| WO | 2005/067219 A2 | 7/2005 |
| WO | 2005/067219 A3 | 12/2005 |

OTHER PUBLICATIONS

Mangold, Stefan,"802.11 ale and Hiper LAN/2: Coexistence and Interworking Using Enhanced PCF", European Telecommunicat ions Standards Institute, Jan. 29, 2001, pp. 1-11, XP002347265.

Wireless LAN Medium Access Control (MAC) and Physical Layer (PHY) Specifications (ISO/IEC 8802-11: 1999), ISO/IEC 8802-11 ANSI/IEEE STD 802.11, 1999, XP002347266, pp. 70-97.

Sheu et al., "Providing Multiple Data Rates in Infrastructure Wireless Networks", Globecom'01 ,2001 IEEE Global Telecommunications Conference San Antonio, TX, Nov. 25-29, 2001 ,vol. 3 of 6,XP001 054904, 5 pages.

International Search Report and Written Opinion received for PCT Patent Application No. PCT/US2004/043340 , dated Nov. 16, 2005, 44 pages.

Vornefeld, U, "Packet Scheduling in SOMA Based Wireless Networks", Vehicular Tech Conf., 2000, IEEE, vol. 5, Sep. 24, 2000, pp. 2132-2139.

Office Action received for U.S. Appl. No. 10/749,293, dated Dec. 12, 2007, 12 pages.

Office Action received for U.S. Appl. No. 10/749,293, dated Nov. 17, 2008, 12 pages.

Office Action received for U.S. Appl. No. 10/749,293, dated Apr. 27, 2009, 11 pages.

Office Action received for U.S. Appl. No. 10/749,293, dated Jun. 19, 2009, 11 pages.

Office Action received for U.S. Appl. No. 10/749,293, dated Oct. 13, 2009, 9 pages.

Office Action received for U.S. Appl. No. 10/749,293, dated Feb. 23, 2010, 11 pages.

Office Action received for U.S. Appl. No. 12/584,780, dated Jun. 5, 2012, 12 pages.

Office Action received for corresponding Chinese Patent Application No. 2004800395937, dated Apr. 4, 2008, 21 pages (Including 14 Pages of English Translation.).

Office Action received for corresponding Chinese Patent Application No. 200480039593 .7, dated Dec. 4, 2009, 10 Pages of Office Action and 20 Pages of English Translation.

Office Action received for corresponding Chinese Patent Application No. 200480039593 .7, dated Jul. 6, 2011, 4 Pages of Office Action and 7 Pages of English Translation, 11 pages.

Office Action received for corresponding European Patent Application No. 04815418.1, dated May 14, 2007, 4 Pages of Office Action.

Written Opinion received for Singapore Patent Application No. 200603277-5, dated May 15, 2008, 7 pages.

Office Action received for corresponding U.S. Appl. No. 12/584,780, dated Nov. 9, 2011, 10 pages.

International Preliminary Report on Patentability received for PCT Patent Application No. PCT/US2004/043340, dated Jul. 13, 2006, 13 pages.

Office Action received for U.S. Appl. No. 12/584,144, dated Sep. 27, 2012, 15 pages.

Office Action received for U.S. Appl. No. 12/584,144, dated Nov. 2, 2012, 18 pages.

Notice of Allowance received for U.S. Appl. No. 12/584,144,dated Mar. 20, 2013, 9 pages.

Office Action received for U.S. Appl. No. 12/584,144, dated Nov. 24, 2009, 10 pages.

Office Action received for U.S. Appl. No. 12/584,144, dated Sep. 15, 2010, 9 pages.

Office Action received for U.S. Appl. No. 12/584,144, dated May 13, 2011, 15 pages.

Office Action received for U.S. Appl. No. 12/584,144, dated Apr. 12, 2012, 18 pages.

(56) References Cited

OTHER PUBLICATIONS

Office Action received for U.S. Appl. No. 12/584,144, dated Apr. 28, 2010, 11 pages.
Office Action received for U.S. Appl. No. 12/584,144, dated Jan. 20, 2011, 10 pages.
Office Action received for U.S. Appl. No. 12/584,144, dated Nov. 22, 2011, 17 pages.
Office Action received for corresponding Chinese Patent Application No. 201210209835.9, dated Apr. 3, 2014, 16 pages (Including 9 pages of English Translation.).
Office Action received for Chinese Patent Application No. 201210209835.9, dated Feb. 2, 2015, 8 pages (Including 5 pages of English Translation.).
Office Action received for Chinese Patent Application No. 201210209835.9, dated May 27, 2015, 5 pages (Including 2 pages of English Translation.).
Office Action received for Chinese Patent Application No. 201210209835.9, dated Sep. 6, 2015, 7 pages. (including 4 pages of English translation.).
Office Action received for European Patent Application No. 04 815 418.1, dated Aug. 4, 2015, 6 pages.
Office Action received for Chinese Patent Application No. 201210209835.9 dated May 3, 2016, 7 pages. (including 4 pages of English Translation.).
Office Action received for U.S. Appl. No. 14/219,271, dated Apr. 28, 2016, 28 pages.
Office Action received for U.S. Appl. No. 14/219,271, dated Jul. 17, 2015, 32 pages.
Notice of Allowance for U.S. Appl. No. 14/219,271, dated Oct. 13, 2016, 31 pages.
Office Action received for U.S. Appl. No. 14/219,271, dated Jan. 29, 2015, 31 pages.
Advisory Action received for U.S. Appl. No. 14/219,271, dated Oct. 22, 2015, 3 pages.

\* cited by examiner

WIRELESS TRANSMISSION OVER SPACE-TIME CHANNELS

CROSS-REFERENCE TO RELATED APPLICATIONS

This application is a continuation application of Ser. No. 12/584,780 filed Sep. 10, 2009, entitled "FILLING THE SPACE-TIME CHANNELS IN SDMA", which was a continuation application of Ser. No. 10/749,293 filed Dec. 30, 2003, entitled "FILLING THE SPACE-TIME CHANNELS IN SDMA".

BACKGROUND

Spatial-Division Multiple-Access (SDMA) is a technique that allows multiple independent transmissions between a wireless Access Point (AP) having multiple antennas and other wireless devices (mobile stations). SDMA provides a performance advantage by enabling the access point to transmit and receive signals to/from multiple stations simultaneously using different spatial channels, which increases throughput of the existing Wireless Local Area Networks (WLANs). However, a need exists for SDMA to mitigate unused channels in uplinks and downlinks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
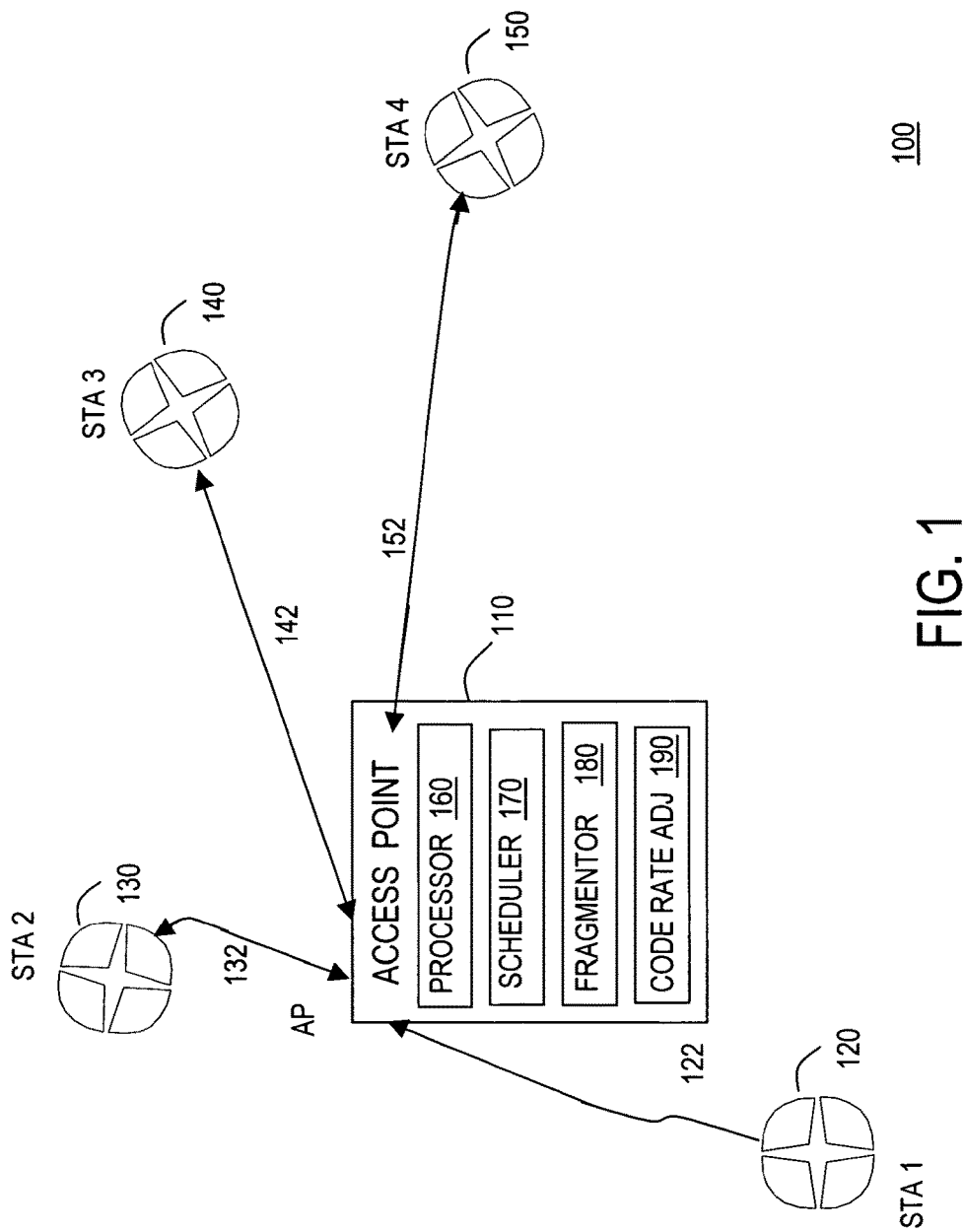
FIG. 1 illustrates a network that includes an Access Point (AP) and mobile stations.

It will be appreciated that for simplicity and clarity of illustration, elements illustrated in the figures have not necessarily been drawn to scale. For example, the dimensions of some of the elements may be exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

FIG. 1 illustrates a network 100 that includes an Access Point (AP) 110 and mobile stations (STAs) 120, 130, 140 and 150. In some embodiments, wireless network 100 is a Wireless Local Area Network (WLAN). For example, one or more of mobile stations 120, 130, 140 and 150 and access point 110 may operate in compliance with a wireless network standard such as ANSI/IEEE Std. 802.11, 1999 Edition, although this is not a limitation of the present invention. As used herein, the term "802.11" refers to any past, present, or future IEEE 802.11 standard, or extension thereto, including, but not limited to, the 1999 edition. Mobile stations 120, 130, 140 and 150 may be any type of terminal or mobile station capable of communicating in network 100. For example, the mobile stations may be computers, personal digital assistants, wireless-capable cellular phones, home audio or video appliances, or the like.

Access point 110 communicates with mobile station 120 (also referred to as "STA1") using signal 122. Access point 110 may also communicate with mobile station 130 (also referred to as "STA2") using signal 132, mobile station 140 (also referred to as "STA3") using signal 142 and mobile station 150 (also referred to as "STA4") using signal 152. Signals 122, 132, 142 and 152 are transmitted through a wireless channel in free space between access point 110 and the various mobile stations.

Access point 110 includes a processor 160 and a Radio Frequency (RF) transceiver to receive and transmit modulated signals from one or more antennas. The analog front end transceiver may be provided as a stand-alone integrated analog circuit, or alternatively, be embedded with processor 160 as a mixed-mode integrated circuit. The received modulated signals are frequency down-converted, filtered, and converted to digital signals. Access point 110 also includes a scheduler 170, a fragmentor 180 and a code rate adjuster 190 whose features are further described herein.

Figure 2:
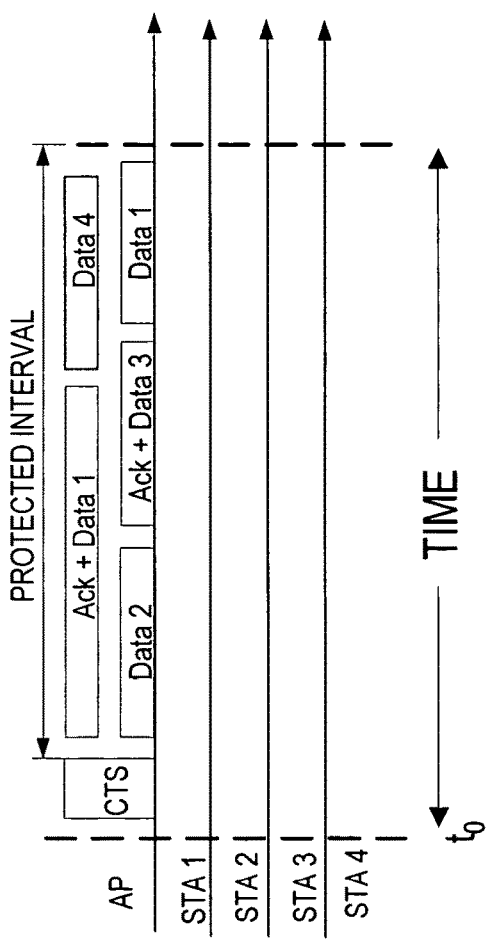
FIG. 2 illustrates a protocol in accordance with the present invention for downlink transmissions.

FIG. 2 illustrates a protocol in accordance with the present invention for downlink transmissions. Channel access marks the beginning of the bi-directional communications between the access point and a mobile station. The channel is accessed by the access point sending a Clear-To-Send (CTS) frame that broadcasts a protected time interval, but other schemes to broadcast a protected time interval may be applied. The protected time interval is announced by access point 110 such that no mobile station contends for the medium during that time interval. The time interval length may be equal to the length of a buffered packet as long as the transmission opportunity (TXOP) in the 802.11e standard, or another time period without limiting the present invention. Access point 110 fills the M spatial channels using the data packets buffered for all stations. Note that this feature is in contrast to conventional Spatial-Division Multiple-Access (SDMA) systems where the access point fills the M channels only using packets buffered for M stations.

Thus, in the SDMA downlink and prior to time t0, access point 110 selects mobile stations that have buffered data. Scheduler 170 (see FIG. 1) schedules data packets that may have differing lengths for transmission to the selected mobile stations, and as shown, arranges those data packets based on transmission times to send on each of the spatial channels. One feature of scheduler 170 is that the system resources of SDMA are efficiently utilized by accounting for the differences in packet lengths to fill the spatial channels by signals in time. Accordingly, the features of scheduler 170 significantly improve the throughput of SDMA on the spatial channels during the protected time interval (beginning at time t0) where data packets are transmitted to the mobile stations.

Scheduler 170 fills M spatial channels by scheduling the traffic for M stations at any time instant, where M is a constant less than or equal to the number of antennas N at the access point. For simplicity of description and by way of example, N antennas may form M spatial channels for M stations at any time instant. The system network 100 throughput is dramatically increased when scheduler 170 fills the M spatial channels at all times. The algorithm of scheduler 170 operates to maximize the usage of the M channels, maximize the total throughput of the M channels, minimize the average bit-error rates that may be affected by the interference between spatial channels, and minimize the average latency.

In accordance with one aspect of the present invention, adaptive antenna arrays are used in conjunction with a beam forming algorithm to achieve spatial diversity within each spatial cell and implement SDMA. That is, signals output by the antennas are directionally formed by selectively energizing different antenna sensors with different signal gains so that remote terminals or mobile stations in one portion of a spatial cell may communicate with access point 110 while other remote mobile stations in a different portion of the spatial cell may communicate with the same access point, even if they are using the same tone set and code.

In another aspect of the present invention, access point 110 in the SDMA downlink first selects a group of mobile stations having buffered data, and then forms spatial channels using the adaptive antenna arrays to send data to the mobile stations. To transmit data on the spatial channels, the access point retrieves the antenna resources to form that spatial channel, with capabilities to form new channels for a waiting mobile station developed on the fly.

In particular, the access point broadcasts a clear-to-send (CTS) packet to hold the medium for a certain duration. Data packets are then sent to mobile stations 120, 130, 140 and 150 using only two spatial channels at any time instant. In the illustrated downlink example, the scheduler 170 designates two data packets, i.e., labeled Ack+Data 1 and Data 1, for mobile station 120. Scheduler 170 does not place the data packets into two spatial channels at the same time since mobile station 120 may not be equipped with multiple antennas to receive the two packets simultaneously. Therefore, scheduler 170 does not exchange the position of the latter data packet labeled Data 1 with either the data packet labeled Data 2 or the data packet labeled Ack+Data 3. Furthermore, to improve channel efficiency and increase throughput, the algorithm of scheduler 170 does not exchange the data packet labeled Data 1 with the data packet labeled Data 4.

Figure 3:
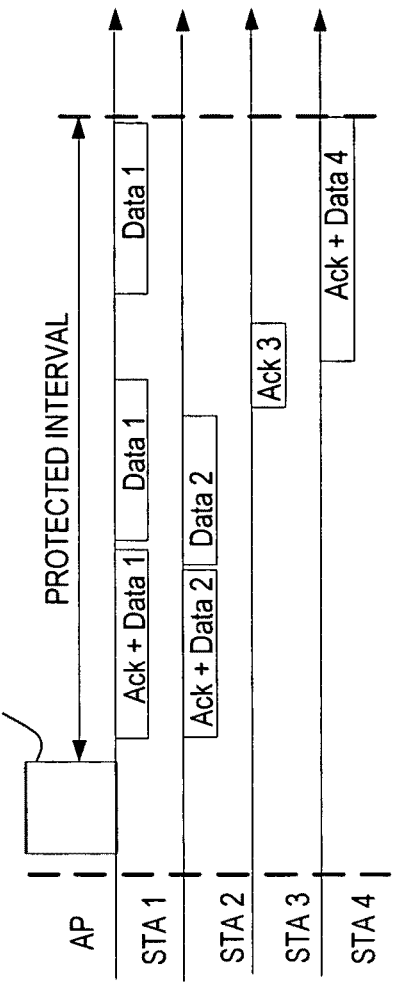
FIG. 3 illustrates a protocol that includes an access point generated schedule for uplink transmissions in accordance with the present invention.

FIG. 3 illustrates a protocol that includes an access point generated schedule for uplink transmissions in accordance with the present invention. In the uplink, scheduler 170 first schedules the transmission intervals for different mobile stations according to the traffic information about the stations such as, for example, packet size, queue size and priority. This information may be acquired by access point 110 through polling or piggy-back feedback from mobile stations 120, 130, 140 and 150. The optimization goals of scheduler 170 are the same as those listed for the downlink. As shown in the figure, the access point broadcasts the schedule to all the mobile stations and listens to the uplink packets. The acknowledgements of the uplink data packets may be sent in normal downlink packets.

The access point broadcasts the schedule packet in order to both announce the transmission opportunities (or intervals) and hold the medium for a certain duration. After the broadcasted schedule is received by mobile stations 120, 130, 140 and 150, the addressed stations respond by sending their data packets within the specified intervals. Mobile station 120 (STA1) is assigned two time intervals and that station sends two packets in the first interval and one packet in the second interval. Access point 110 may broadcast the schedule using an omni-directional antenna, since the schedule is directed collectively to mobile stations 120, 130, 140 and 150, and there are only two spatial channels available at each time instant.

Figure 4:
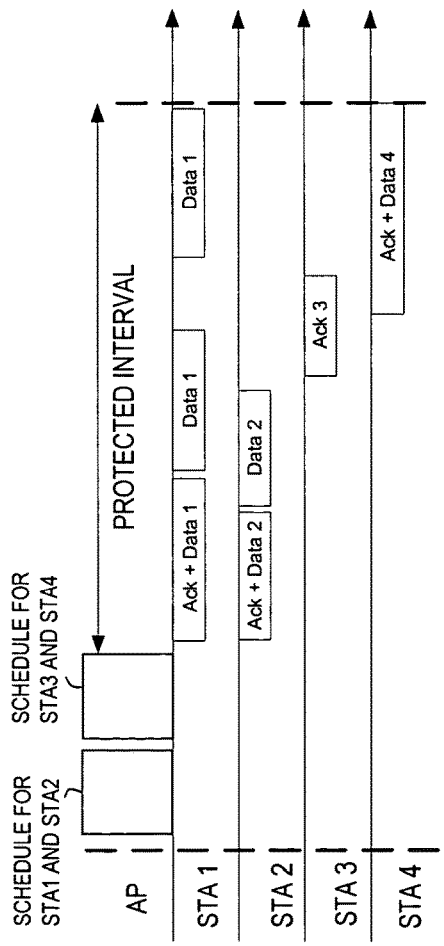
FIG. 4 illustrates a protocol that includes multiple schedules generated by an access point for uplink transmissions in accordance with the present invention.

FIG. 4 illustrates a protocol that includes multiple schedules generated by access point 110 for uplink transmissions in accordance with the present invention. If the omni-directional antenna can not reach mobile stations based on distance, several schedule packets instead of one may be sent through spatial channels with higher antenna gains. The figure illustrates an example for two schedule packets, where the first schedule packet is prepared for mobile stations 120 (STA1) and 130 (STA2) and the second schedule packet is prepared for mobile stations 140 (STA3) and 150 (STA4). In other words, the first schedule packet schedules the uplink time interval using spatial channels pointed to STA1 and STA2, and the second schedule packet schedules the uplink time interval using spatial channels pointed to STA3 and STA4.

Figure 5:
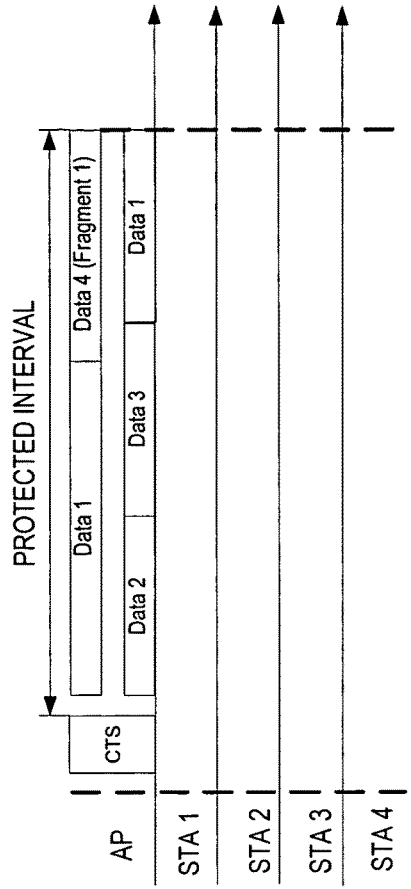
FIG. 5 illustrates a transmission that incorporates fragmentation at the end of a protected interval.

FIG. 5 illustrates a transmission of data packets that incorporates fragmentation at the end of a protected interval to improve the channel efficiency. The fragmentor 180 in access point 110 (see FIG. 1) and a fragmentor unit in mobile stations 120, 130, 140 and 150 may employ fragmentation to completely fill the space-time channels in the downlink. For example, the access point may fill the channels of data packets next to each other and fragment some packets at the end of the protected interval, although this is not a limitation of the present invention. As shown in the figure, the data packet prepared for mobile station 150 (STA4) is fragmented to fit the protected interval. Note that since data packets Data 2 and Data 3 are sent to different mobile stations through different spatial channels, they are placed next to each other and do not need to be separated by a Short Inter-Frame Spacing (SIFS).

Figure 6:
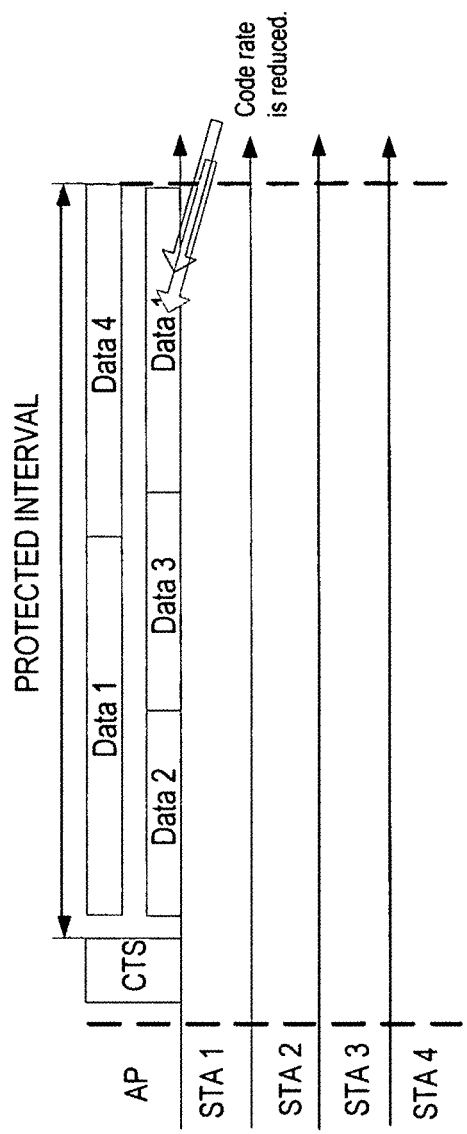
FIG. 6 illustrates a transmission that incorporates a code rate adjustment at the end of a protected interval.

FIG. 6 illustrates a data packet transmission that incorporates a code rate adjustment at the end of a protected interval. Code rate adjustment changes the code rates of the Forward Error-Correction (FEC) codes in the packets and may be employed to fill the space-time channels. Code rate adjustment can be applied to multiple packets within the protected interval. Note that a higher code rate may increase the chance that the packet gets lost, while the lower code rate may increase the length of the data packets. The access point and the mobile stations may adjust the packet length by changing the code rate and making the appropriate tradeoffs. Since the access point usually is not power critical, reducing the code rate to fill the channels may be desired. As illustrated in the figure, the code rate of the latter Data 1 packet has been reduced such that its reliability is increased without reducing the system throughput.

By now it should be apparent that a Medium Access Control (MAC) protocol may be used to enhance the efficiency of SDMA systems in accordance with features of the present invention, such features including fragmentation, data traffic scheduling, adding error rate control bits and retrieving antenna resources to form spatial channels developed on the fly.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. An apparatus to cause an Access Point (AP) to transmit and receive Radio Frequency (RF) signals using a plurality of space-time channels in a wireless network, the apparatus comprising:
processor circuitry to process digital signals corresponding to the RF signals;
a scheduler circuit to schedule data packets to be transmitted to a first number of mobile stations in the wireless network, the scheduler circuit to schedule the data packets while accounting for differing lengths of the data packets;
a fragmentor circuit to fragment the data packets according to a protected time interval of a transmission opportunity (TXOP); and
a code rate circuit to apply a Forward Error Correction (FEC) coding rate for transmission of the data packets using the plurality of space-time streams according to the protected time interval of the TXOP,
wherein the data packets are to be transmitted to the first number of mobile stations via spatial channels formed by a second number of antennas of the AP.

2. The apparatus of claim 1 configured to cause the AP to transmit the RF signals using Spatial-Division Multiple-Access (SDMA).

3. The apparatus of claim 1 configured to cause the AP to transmit the RF signals using Multi-User (MU) space-time channels.

4. The apparatus of claim 1, wherein the fragmentor circuit is to fill the plurality of space-time channels with fragmented data packets.

5. The apparatus of claim 1, wherein the scheduler circuit is to schedule variable length packets for transmission based on transmission times to simultaneously transmit on each of the spatial channels.

6. The apparatus of claim 5, wherein the scheduler circuit is to schedule the variable length packets for transmission by filling the spatial channels using data packets buffered for all of said first number of mobile stations.

7. The apparatus of claim 1, wherein a number of the spatial channels is less than or equal to the second number of antennas of the AP.

8. The apparatus of claim 1 comprising an RF transceiver to receive and transmit the RF signals.

9. The apparatus of claim 1 comprising the second number of antennas.

10. An apparatus comprising:
processor circuitry to process digital signals; and
logic, at least a portion of which is in hardware, the logic to cause an Access Point (AP) to:
schedule data packets while accounting for differing lengths of the data packets, the data packets to be transmitted to a first number of mobile stations in a wireless network using a plurality of space-time channels;
fragment the data packets according to a protected time interval of a transmission opportunity (TXOP); and
apply a Forward Error Correction (FEC) coding rate for transmission of the data packets using the plurality of space-time streams according to the protected time interval of the TXOP,
wherein the data packets are to be transmitted to the first number of mobile stations via spatial channels formed by a second number of antennas of the AP.

11. The apparatus of claim 10 configured to cause the AP to transmit the data packets using Spatial-Division Multiple-Access (SDMA).

12. The apparatus of claim 10 configured to cause the AP to transmit the data packets using Multi-User (MU) space-time channels.

13. The apparatus of claim 10 configured to cause the AP to fill the plurality of space-time channels with fragmented data packets.

14. The apparatus of claim 10 configured to cause the AP to schedule variable length packets for transmission based on transmission times to simultaneously transmit on each of the spatial channels.

15. The apparatus of claim 14 configured to cause the AP to schedule the variable length packets for transmission by filling the spatial channels using data packets buffered for all of said first number of mobile stations.

16. The apparatus of claim 10, wherein a number of the spatial channels is less than or equal to the second number of antennas of the AP.

17. The apparatus of claim 10 comprising a Radio Frequency (RF) transceiver to receive and transmit RF signals.

18. The apparatus of claim 10 comprising the second number of antennas.

19. A product comprising at least one tangible computer-readable non-transitory storage media comprising computer-executable instructions operable to, when executed by at least one processor, enable the at least one processor to cause an Access Point (AP) to:
schedule data packets while accounting for differing lengths of the data packets, the data packets to be transmitted to a first number of mobile stations in a wireless network using a plurality of space-time channels;
fragment the data packets according to a protected time interval of a transmission opportunity (TXOP); and
apply a Forward Error Correction (FEC) coding rate for transmission of the data packets using the plurality of space-time streams according to the protected time interval of the TXOP,
wherein the data packets are to be transmitted to the first number of mobile stations via spatial channels formed by a second number of antennas of the AP.

20. The product of claim 19, wherein the instructions, when executed, cause the AP to transmit the data packets using Spatial-Division Multiple-Access (SDMA).

21. The product of claim 19, wherein the instructions, when executed, cause the AP to transmit the data packets using Multi-User (MU) space-time channels.

22. The product of claim 19, wherein the instructions, when executed, cause the AP to fill the plurality of space-time channels with fragmented data packets.

23. The product of claim 19, wherein the instructions, when executed, cause the AP to schedule variable length packets for transmission based on transmission times to simultaneously transmit on each of the spatial channels.

24. The product of claim 23, wherein the instructions, when executed, cause the AP to schedule the variable length packets for transmission by filling the spatial channels using data packets buffered for all of said first number of mobile stations.

25. The product of claim 19, wherein a number of the spatial channels is less than or equal to the second number of antennas of the AP.

* * * * *